(12) United States Patent
Watanabe

(10) Patent No.: US 9,239,098 B2
(45) Date of Patent: Jan. 19, 2016

(54) PLANET ROLLER SPEED CHANGER

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/564,428

(22) Filed: Dec. 9, 2014

(65) Prior Publication Data

US 2015/0167821 A1    Jun. 18, 2015

(30) Foreign Application Priority Data

Dec. 12, 2013  (JP) .................................. 2013-257098

(51) Int. Cl.
*F16H 13/08* (2006.01)
*F16H 13/14* (2006.01)
*F16H 57/08* (2006.01)
*F16H 13/06* (2006.01)

(52) U.S. Cl.
CPC ................ *F16H 13/08* (2013.01); *F16H 13/06* (2013.01); *F16H 13/14* (2013.01); *F16H 57/082* (2013.01); *F16H 2057/085* (2013.01)

(58) Field of Classification Search
CPC ..................................................... F16H 13/08
USPC ......................................................... 475/195
See application file for complete search history.

(56) References Cited

U.S. PATENT DOCUMENTS 2,815,685 A * 12/1957 Parrett .......................... 475/183
6,039,668 A *  3/2000 Kolstrup ................. F16H 13/06
                                                                              475/183

FOREIGN PATENT DOCUMENTS

| GB | 585 876 A | 2/1947 |
| JP | S60-157556 A | 8/1985 |
| JP | S63-33055 U | 3/1988 |
| JP | A-2003-161351 | 6/2003 |

OTHER PUBLICATIONS

Aug. 5, 2015 Search Report issued in European Patent Application No. 14196200.1.

* cited by examiner

*Primary Examiner* — Erin D Bishop
(74) *Attorney, Agent, or Firm* — Oliff PLC

(57) ABSTRACT

In a planet roller speed changer, a plurality of shaft portions of a carrier is disposed such that, when the carrier is displaced in a direction that intersects with the axial direction of an output shaft, the outer periphery of at least one of the shaft portions that are displaced with a displacement of the carrier contacts the stationary ring-side portion of the inner periphery of a corresponding planet roller without contacting the input shaft-side portion of the inner periphery of the corresponding planet roller.

3 Claims, 7 Drawing Sheets

PLANET ROLLER SPEED CHANGER

INCORPORATION BY REFERENCE

The disclosure of Japanese Patent Application No. 2013-257098 filed on Dec. 12, 2013, including the specification, drawings and abstract, is incorporated herein by reference in its entirety.

BACKGROUND OF THE INVENTION

1. Field of the Invention

The invention relates to a planet roller speed changer.

2. Description of the Related Art

As described in Japanese Patent Application Publication No. 2003-161351 (JP 2003-161351 A), there is a conventional planet roller speed changer (traction drive) in which each of cylindrical planet rollers is rotatably supported in a loosely fitted state by a pin that passes through the inner periphery of the planet roller and that protrudes from a carrier. A cylindrical bushing is fixedly fitted onto the outer periphery of each pin. Because each planet roller is in the loosely fitted state, there is a clearance between the inner periphery of the planet roller and the outer periphery of a corresponding one of the bushings.

For example, the planet roller speed changer is mounted transversely in an apparatus such as an image forming apparatus (i.e., mounted in a state where an input shaft and an output shaft of the planet roller speed changer extend along the horizontal direction) in some cases. In such a mounted state, the carrier may be displaced downward from a prescribed position under its own weight. As a result, there sometimes occurs a state where the center of rotation of the carrier and the center of revolutions of the planet rollers supported in the loosely fitted state by the pins of the carrier do not coincide with each other, that is, a state where the center of rotation of the carrier is misaligned with the center of revolutions of the planet rollers.

In this case, if the outer peripheral face of the bushing contacts the input shaft side-portion of the inner periphery of the planet roller due to the misalignment of the center of rotation of the carrier with the center of revolutions of the planet rollers, the revolution of the pin may be promoted. Due to a change in the relative position between the planet roller and the pin caused by the misalignment of the center of rotation of the carrier with the center of revolutions of the planet rollers, rotation of the carrier is advanced or delayed when the output shaft is rotating. When the outer peripheral face of the bushing contacts the input shaft side-portion of the inner periphery of the planet roller, the rotation of the carrier is advanced or delayed significantly. As a result, large rotational fluctuations may occur in the planet roller speed changer.

SUMMARY OF THE INVENTION

One object of the invention is to provide a planet roller speed changer with a high degree of rotation accuracy, in which rotational fluctuations due to misalignment of the center of rotation of a carrier with the center of revolutions of planet rollers are restricted even if the misalignment occurs.

An aspect of the invention relates to a planet roller speed changer including: an input shaft; a stationary ring disposed around the input shaft so as to be concentric with the input shaft; as plurality of cylindrical planet rollers that are in rolling contact with both the input shaft and the stationary ring; an output shaft; and a carrier having a plurality of shaft portions each of which is disposed in a corresponding one of the planet rollers, passes through the corresponding one of the planet rollers, and supports the corresponding one of the planet rollers in a loosely fitted state such that the corresponding one of the rollers is rotatable, the carrier being fixed to the output shaft so as to be rotatable together with the output shaft. The shaft portions of the carrier are disposed such that, when the carrier is displaced in a direction that intersects with the axial direction of the output shaft, the outer periphery of at least one of the shaft portions that are displaced with a displacement of the carrier contacts the stationary ring-side portion of an inner periphery of the corresponding planet roller without contacting the input shaft-side portion of the inner periphery of the corresponding planet roller.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
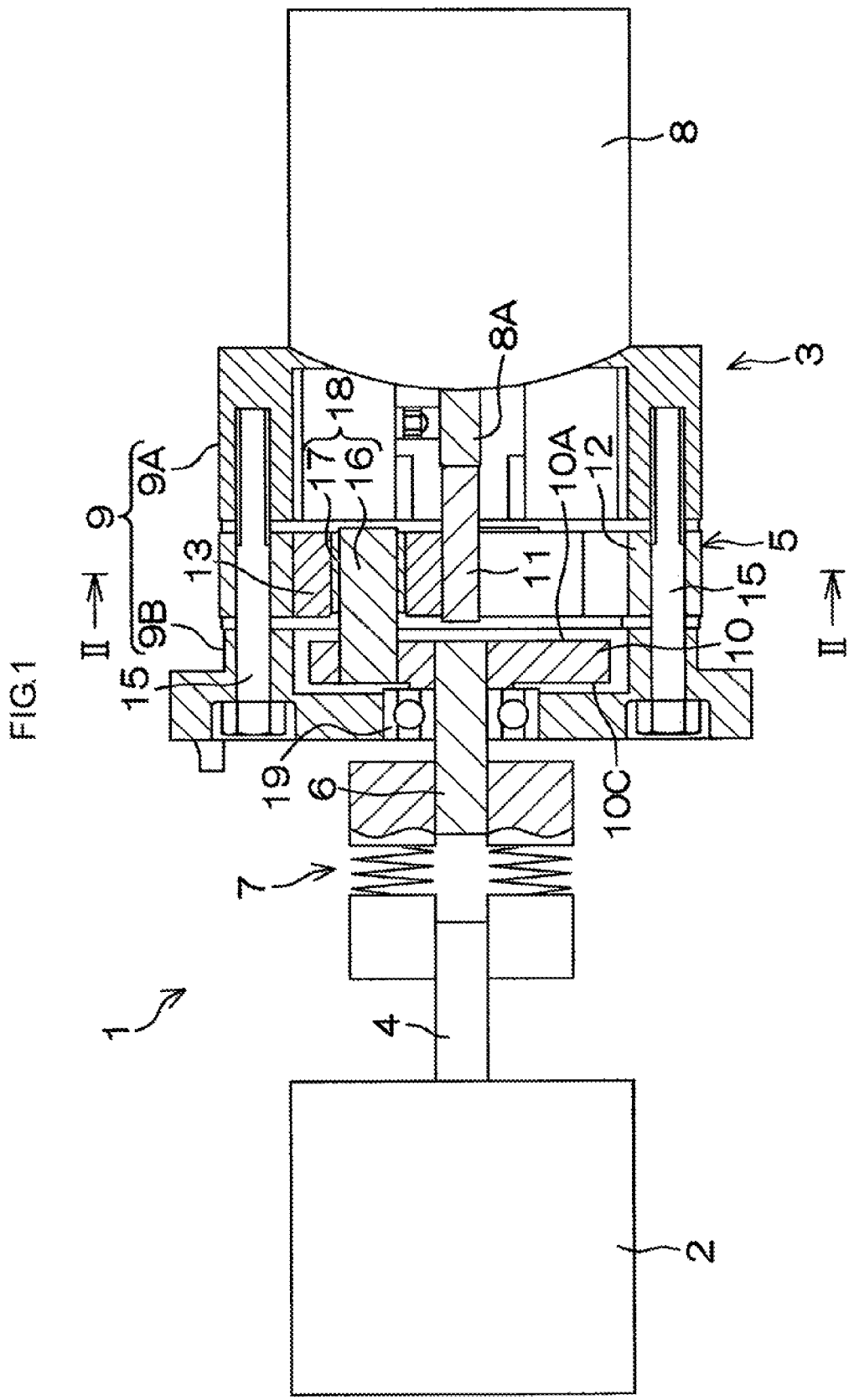
FIG. 1 is a view illustrating the schematic configuration of a power transmitting device of an image forming apparatus in which a planet roller speed changer according to a first embodiment of the invention is mounted.
Figure 2:
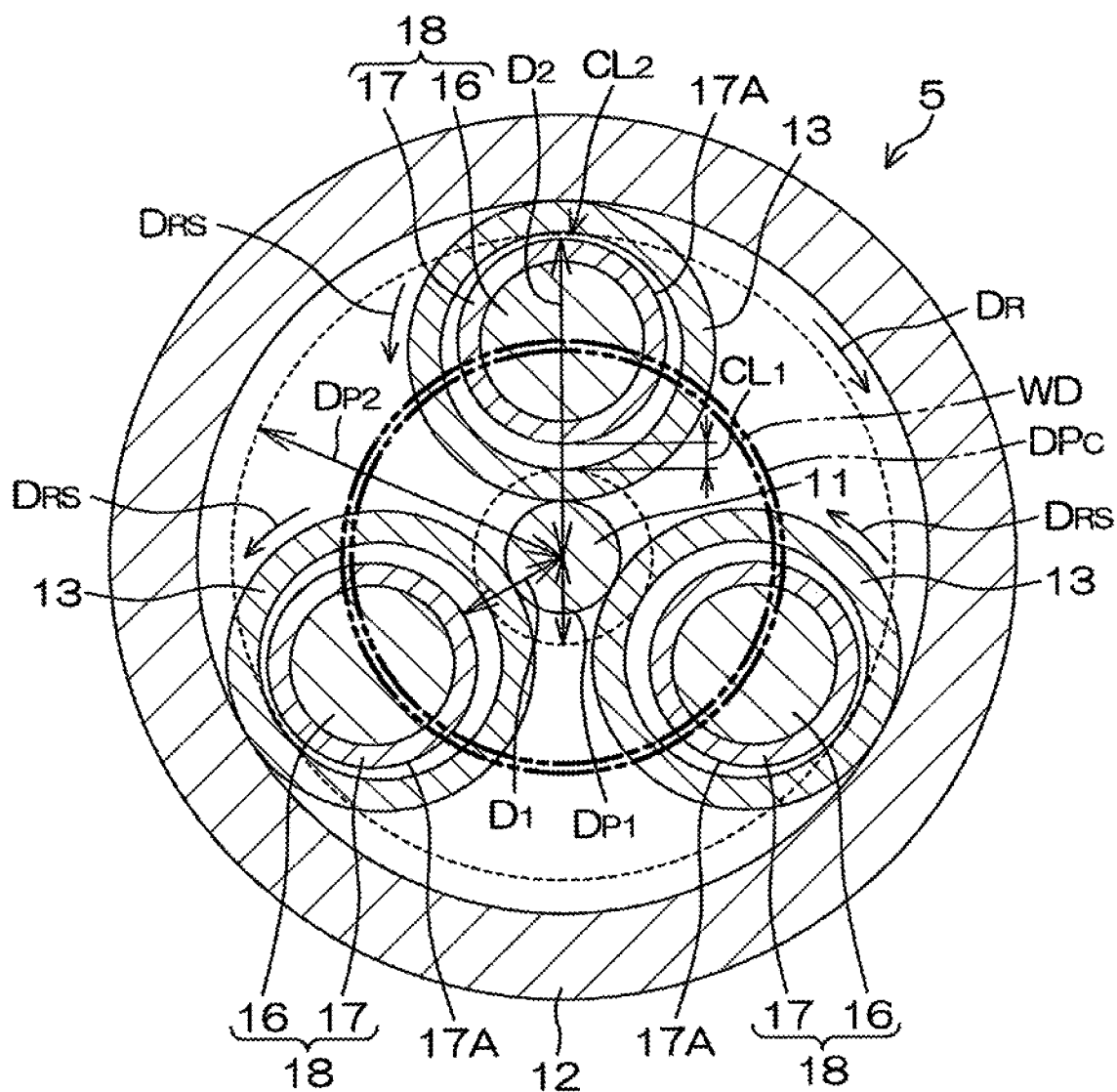
FIG. 2 is a cross-sectional view taken along the line II-II in FIG. 1.

Hereinafter, example embodiments of the invention will be described in detail with reference to the accompanying drawings. FIG. 1 is a view illustrating the schematic configuration of a power transmitting device 1 of an image forming apparatus such as a printer, in which a planet roller speed changer 5 according to a first embodiment of the invention is mounted. FIG. 2 is a cross-sectional view taken along the line II-II in FIG. 1. The power transmitting device 1 of the image forming apparatus includes a body 2 to be driven (hereinafter, referred to as "driven body 2"), a planet roller speed changing unit 3, and a coupling 7. The driven body 2 is driven to be rotated by the planet roller speed changing unit 3. The coupling 7 couples a driven body input shaft 4 of the driven body 2 and an output shaft 6 of the planet roller speed changer 5 to each other. In the power transmitting device 1, the planet roller speed changing unit 3 is mounted transversely so that the output shaft 6 extends horizontally.

The planet roller speed changing unit 3 includes an electric motor 8, the planet roller speed changer 5, and a housing 9. The housing 9 houses the electric motor 8 and the planet roller speed changer 5 together with each other. The housing 9 includes a first housing 9A made of, for example, aluminum, and a second housing 9B made of, for example, aluminum. The first housing 9A houses and holds the electric motor 8. The second housing 9B houses and holds a part of the output shaft 6 and a carrier 10, which will be described later.

The planet roller speed changer 5 includes an input shaft 11, a stationary ring (sun ring) 12, a plurality of (for example, three in the present embodiment) planet rollers 13, the output shaft 6, and the carrier 10. A motor shaft 8A of the electric motor 8 is coupled to the input shaft 11. Note that the motor shaft 8A may be provided as the input shaft 11. The stationary ring 12 is fixedly disposed between the first housing 9A and the second housing 9B so as to be concentric with the input shaft 11. The stationary ring 12 has an annular shape, and is made of, for example, bearing steel. The first housing 9A, the stationary ring 12 and the second housing 9B are fixed together with a plurality of bolts 15.

The planet rollers 13 are housed and disposed in the stationary ring 12. The planet rollers 13 are arranged at equal angular intervals in an annular space formed between the stationary ring 12 and the input shaft 11. Each of the planet rollers 13 is disposed so as to be in rolling contact with both the outer peripheral face of the input shaft 11 and the inner peripheral face of the stationary ring 12 via traction oil in a pressure contact state. Each of the planet rollers 13 has a cylindrical shape (or an annular shape), and is made of, for example, bearing steel.

The carrier 10 has a disc shape. On one side face (right side face in FIG. 1) 10A of the carrier 10, columnar pins 16, of which number is the same as the number of planet rollers 13, are projected perpendicularly to the one side face 10A. In other words, the planet rollers 13 are disposed so as to be perpendicular to the single carrier 10. The pins 16 may be components formed separately from the carrier 10 as illustrated in FIG. 1, or may be formed integrally with the carrier 10. Each pin 16 passes through a corresponding one of the planet rollers 13, and the planet roller 13 is supported rotatably in a loosely fitted state by the pin 16. Each of the pins 16 has a columnar shape, and is made of, for example, bearing steel.

A cylindrical bushing 17 is interposed between the planet roller 13 and the pin 16 in each set. The bushing 17 has the outer peripheral face 17A (hereinafter, sometimes referred to as "outer periphery of as shaft portion 18") formed of a cylindrical face. The thickness of the bushing 17 is uniform over the entire region in its circumferential direction. The bushing 17 is made of, for example, resin or ceramics, and is fixed onto the outer periphery of the pin 16 by interference fit. The pin 16 and the bushing 17 constitute the shaft portion 18.

The output shaft 6 is fixed to the other side face (left side face in FIG. 1) 10C of the carrier 10. An intermediate portion of the output shaft 6 is supported at one point by the second housing 9B via a single rolling bearing 19. Thus, the output shaft 6 is rotatably disposed. Rotary driving force from the electric motor 8 is applied to the input shaft 11, whereby each planet roller 13 rotates about its axis in a prescribed rotational direction $D_{RS}$, and in addition, the planet rollers 13 revolve in a prescribed revolving direction $D_R$. The carrier 10 rotates (about its axis) due to the revolutions of the planet rollers 13. Rotary driving force of the carrier 10 is taken out from the planet roller speed changer 5 via the output shaft 6. With the rotary driving force, the driven body 2 of the image forming apparatus is driven to be rotated.

As illustrated in FIG. 2, a clearance is formed between the inner periphery of each planet roller 13 and the outer periphery of a corresponding one of the bushings 17. The position and outer diameter of each pin 16 and the inner and outer diameters of each bushing 17 (that is, the position of the outer periphery of each shaft portion 18) are set such that, in the case where the center of each pin 16 (the center of each shaft portion 18), the center of the corresponding planet roller 13, and the center of the input shaft 11 are aligned on a single straight line, a clearance $CL_1$ between the shaft portion 18 and the planet roller 13 on the input shaft 11 side is larger than a clearance $CL_2$ between the shaft portion 18 and the planet roller 13 on the stationary ring 12 side.

In this case, the clearance $CL_1$ is expressed by Expression (1) indicated below.

$$CL_1 = D_1 - D_{P1} \quad (1)$$

In the Expression (1), $D_1$ is the distance from the center of rotation of the carrier 10 to the innermost position of the outer periphery of each shaft portion 18 in the radial direction of the planet roller speed changer 5, $D_{P1}$ is the radius (inscribed radius) of a circle around the center of rotation of the carrier 10, at the innermost position in the radial direction of the planet roller speed changer 5, among positions at which each of the planet rollers 13 contacts the corresponding shaft portion 18.

The clearance $CL_2$ is expressed by Expression (2) indicated below.

$$CL_2 = D_{P2} - D_2 \quad (2)$$

In the Expression (2), $D_2$ is the distance from the center of rotation of the carrier 10 to the outermost position of the outer periphery of the shaft portion 18 in the radial direction of the planet roller speed changer 5, $D_{P2}$ is the radius (circumscribed radius) of a circle around the center of rotation of the carrier 10, at the outermost position in the radial direction of the planet roller speed changer 5, among positions at winch each of the planet rollers 13 contacts the corresponding shaft portion 18. In other words, the position of the outer periphery of each of the shaft portions 18 is set such that a pitch circle diameter $DP_C$ of the carrier 10 is larger than a value WD obtained by doubling the inter-axis distance between the input shaft 11 and each planet roller 13. Note that, in this case, the pitch circle diameter $DP_C$ is expressed by Expression (3) indicated below, and the value WD obtained by doubling the inter-axis distance between the input shaft 11 and each planet roller 13 is expressed by Expression (4) indicated below.

$$DP_C = D_1 + D_2 \quad (3)$$

$$WD = D_S + D_P \quad (4)$$

In the Expression (4), $D_P$ is the outer diameter of each planet roller 13, and $D_S$ is the outer diameter of the input shaft 11.

Because the planet roller speed changing unit 3 is mounted transversely, the carrier 10 may be displaced downward from a prescribed position under its own weight (the carrier 10 may be displaced in a direction that intersects with the axial direction of the output shaft 6). In particular, when the output shaft 6 is supported at its one position in the axial direction (supported in a cantilever manner) as in the present embodiment, the carrier 10 is easily displaced downward. The downward displacement of the carrier 10 may cause a state where the center of rotation of the carrier 10 and the center of revolutions of the planet rollers 13 supported by the respective shaft portions of the carrier 10 in the loosely fitted state do not coincide with each other. That is, the center of the carrier 10 is misaligned with the center of revolutions of the planet rollers 13 (the rotation axis of the input shaft 11).

Figure 3:
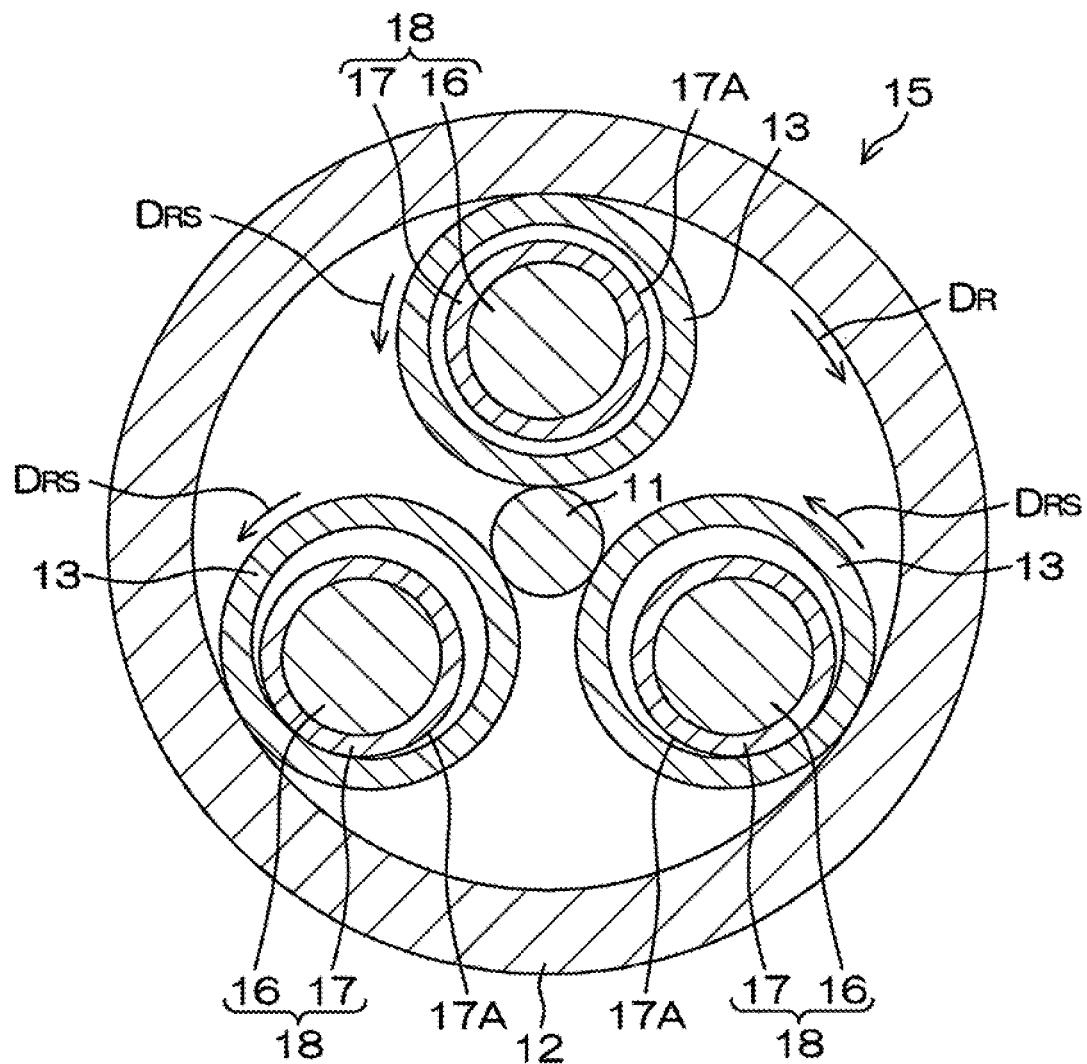
FIG. 3 is a cross-sectional view illustrating a state where the center of rotation of a carrier is misaligned with the center of revolutions of planet rollers in the planet roller speed changer according to the first embodiment of the invention.

FIG. 3 is a cross-sectional view illustrating a state where the center of rotation of the carrier 10 is misaligned with the center of revolutions of the planet rollers 13 in the planet roller speed changer 5 according to the first embodiment of the invention. In the planet roller speed changer 5, the pitch circle diameter $DP_C$ (refer to FIG. 2) of the carrier 10 is set larger than the value WD obtained by doubling the inter-axis distance (refer to FIG. 2) between the input shaft 11 and each planet roller 13. As a result, the clearance between each shaft portion 18 and a corresponding one of the planet rollers 13 on the input shaft 11 side is larger than the clearance between each shaft portion 18 and a corresponding one of the planet rollers 13 on the stationary ring 12 side.

Thus, when the carrier 10 is displaced downward from the prescribed position under its own weight, the outer peripheral face 17A of the bushing 17 of at least one of the shaft portions 18 (the two shaft portions 18 located on the lower side, in FIG. 3) contacts the stationary ring 12-side portion of the inner periphery of the corresponding planet roller 13 instead of contacting the input shaft 11-side portion of the inner periphery of the corresponding planet roller 13. At this time, frictional force is generated between the outer peripheral face 17A of the bushing 17 and the inner peripheral face of the planet roller 13 that is rotating about its axis. In this case, because the revolving direction $D_R$ of the shaft portions 18 and the rotational direction $D_{RS}$ of each planet roller 13 are opposite to each other, the generated frictional force acts so as to extrude the shaft portion 18 toward the rotational direction of the carrier 10. As a result, aligning of the shaft portion 18 is promoted.

Due to a change in the relative position between the planet roller 13 and the pin 16 caused by the misalignment of the center of rotation of the carrier 10 with the center of revolutions of the planet rollers 13, the rotation of the carrier 10 is advanced or delayed when the output shaft 6 is rotating. In this case, the outer peripheral face 17A of the bushing 17 contacts the input shaft-11 side portion of the inner periphery of the corresponding planet roller 13, whereby aligning of the shaft portion 18 is promoted. Thus, advancement and delay of the rotation of the carrier 10 are restricted, and as a result, rotational fluctuations generated in the planet roller speed changer 5 are reduced. Thus, even in a case where misalignment of the center of rotation of the carrier 10 with the center of revolutions of the planet rollers 13 occurs, the rotational fluctuations caused by the misalignment are restricted. As a result, the planet roller speed changer 5 with a high degree of rotation accuracy is provided.

Figure 4:
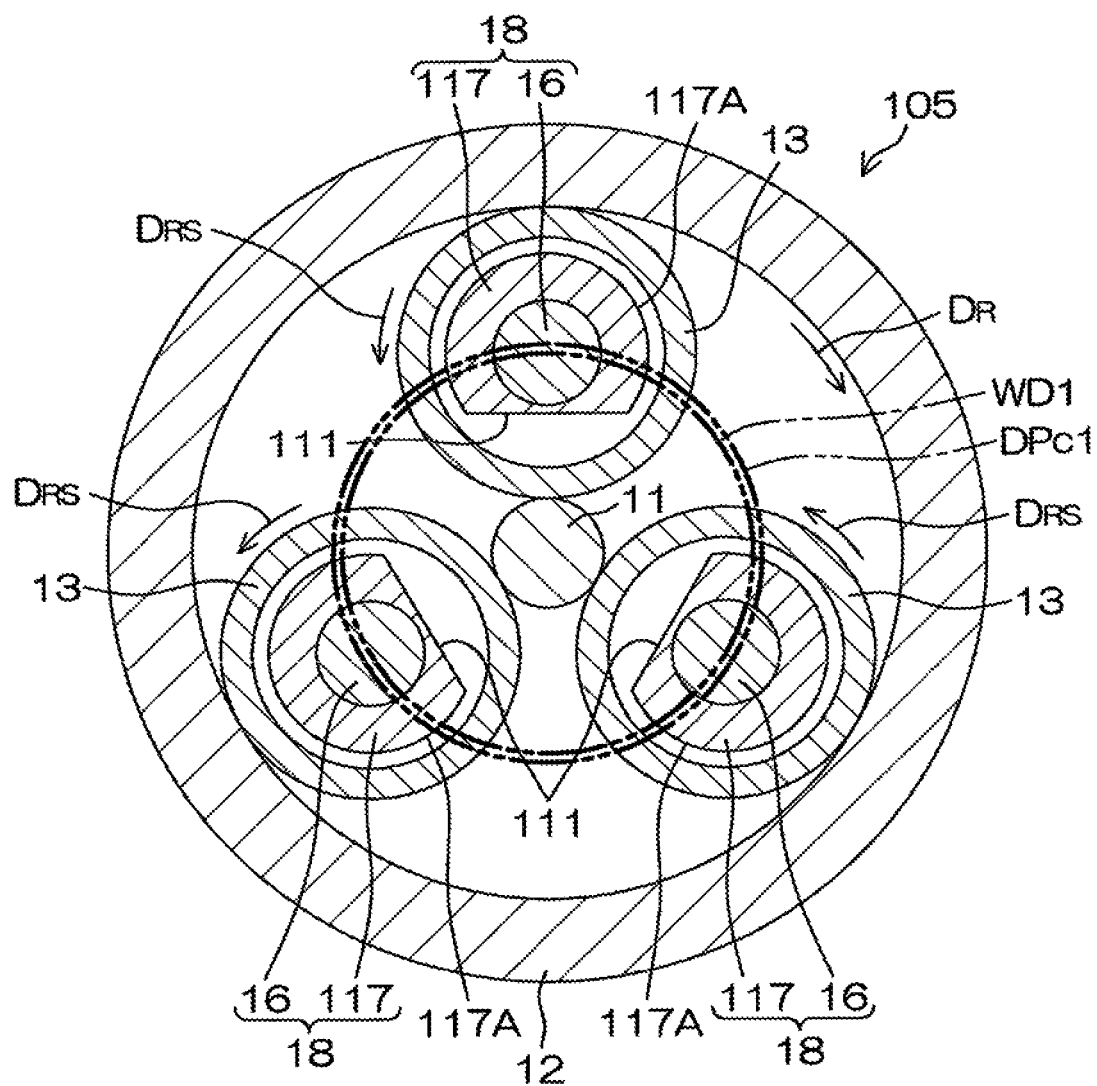
FIG. 4 is a cross-sectional view illustrating the configuration of a planet roller speed changer according to a second embodiment of the invention.
Figure 5:
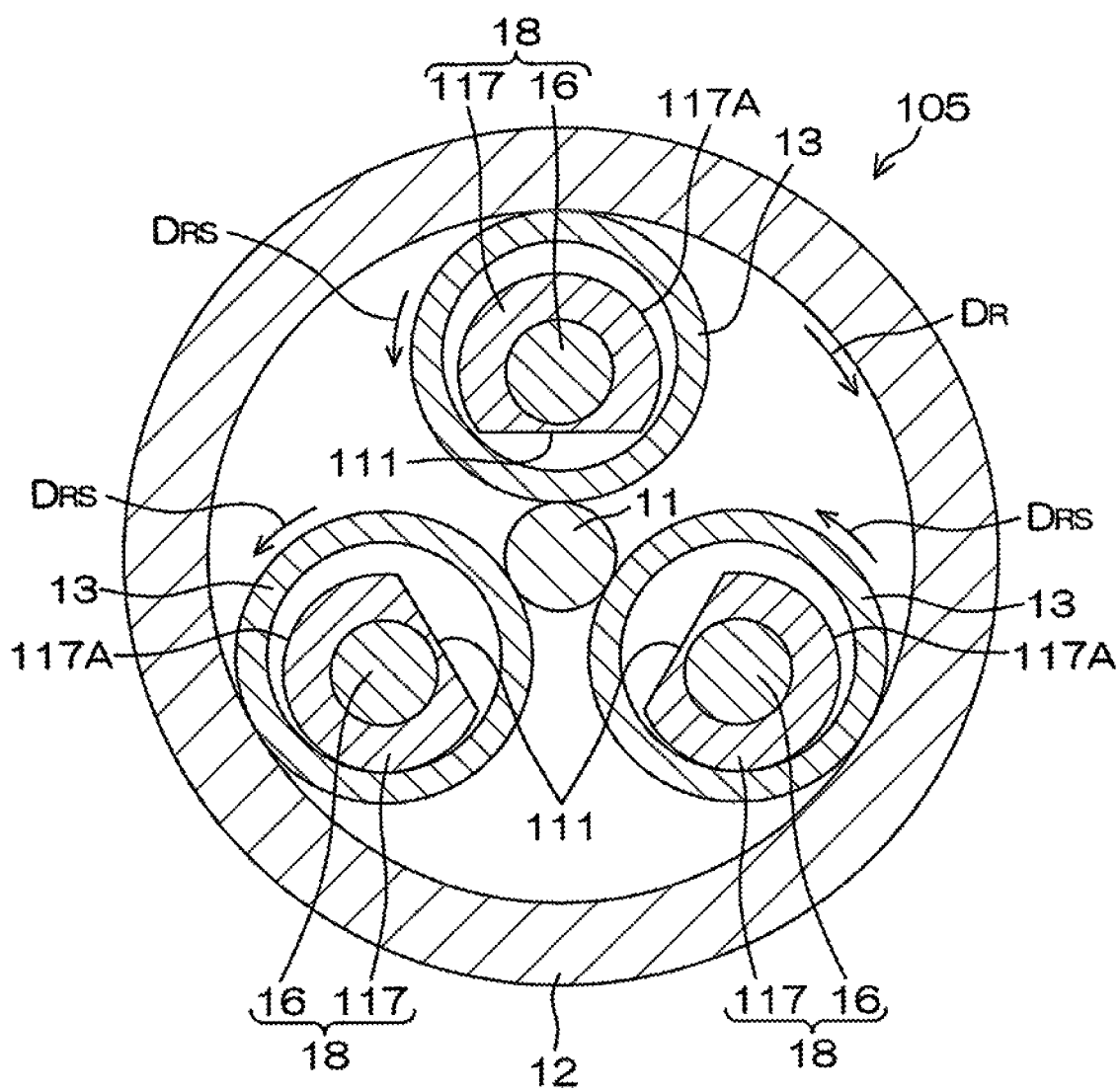
FIG. 5 is a cross-sectional view illustrating a state where the center of rotation of the carrier is misaligned with the center of revolutions of the planet rollers in the planet roller speed changer according to the second embodiment of the invention.

FIG. 4 is a cross-sectional view illustrating the configuration of a planet roller speed changer 105 according to a second embodiment of the invention. FIG. 5 is a cross-sectional view illustrating a state where the center of rotation of the carrier 10 is misaligned with the center of revolutions of the planet rollers 13 in the planet roller speed changer 105 according to the second embodiment of the invention. Note that, the same configurations of the planet roller speed changer 105 according to the second embodiment as those in the planet roller speed changer 5 according to the first embodiment will be denoted by the same reference symbols as those in the first embodiment, and description thereon will be omitted.

In the planet roller speed changer 105, a pitch circle diameter $DP_C1$ of the carrier 10 is set substantially equal to a value WD1 obtained by doubling the inter-axis distance between the input shaft 11 and each planet roller 13. In this case, the clearance between the shaft portion 18 and the planet roller 13 on the input shaft 11 side is substantially equal to the clearance between the shaft portion 18 and the planet roller 13 on the stationary ring 12 side. In the second embodiment, each shaft portion 18 includes a bushing 117 in place of the bushing 17. The bushing 117 has a generally cylindrical shape. The bushing 117 has an outer peripheral face 117A having a cylindrical face. Each of the outer peripheral faces 117A has a cut portion 111 formed of a flat face, and the radius of the bushing 117 at the cut portion 111 is shorter than the radius of the bushing 117 at the other portion than the cut portion 111. The cut portion 111 is located at a part of the bushing 117 in the circumference direction of the input shaft 11, and extends over the entire region in the axial direction of the bushing 117.

In the present embodiment, when the carrier 10 is displaced downward under its own weight and thus the center of rotation of the carrier 10 is misaligned with the center of revolutions of the planet rollers 13, the two shaft portions 18 located on the lower side in FIG. 5 contact the stationary ring 12-side portions of the inner peripheries of the corresponding planet rollers 13 before the one shaft portion 18 located on the upper side in FIG. 5 contacts the input shaft-11 side portion of the inner periphery of the corresponding planet roller 13. In this case, as in the first embodiment, frictional force generated between the outer peripheral face 117A of the bushing 117 and the inner peripheral face of the planet roller 13 that is rotating about its axis acts so as to extrude the shaft portion 18 toward the rotational direction of the carrier 10. As a result, aligning of the shaft portion 18 is promoted. Thus, advancement and delay of the rotation of the carrier 10 are restricted, and as a result, rotational fluctuations generated in the planet roller speed changer 5 are reduced.

Figure 6:
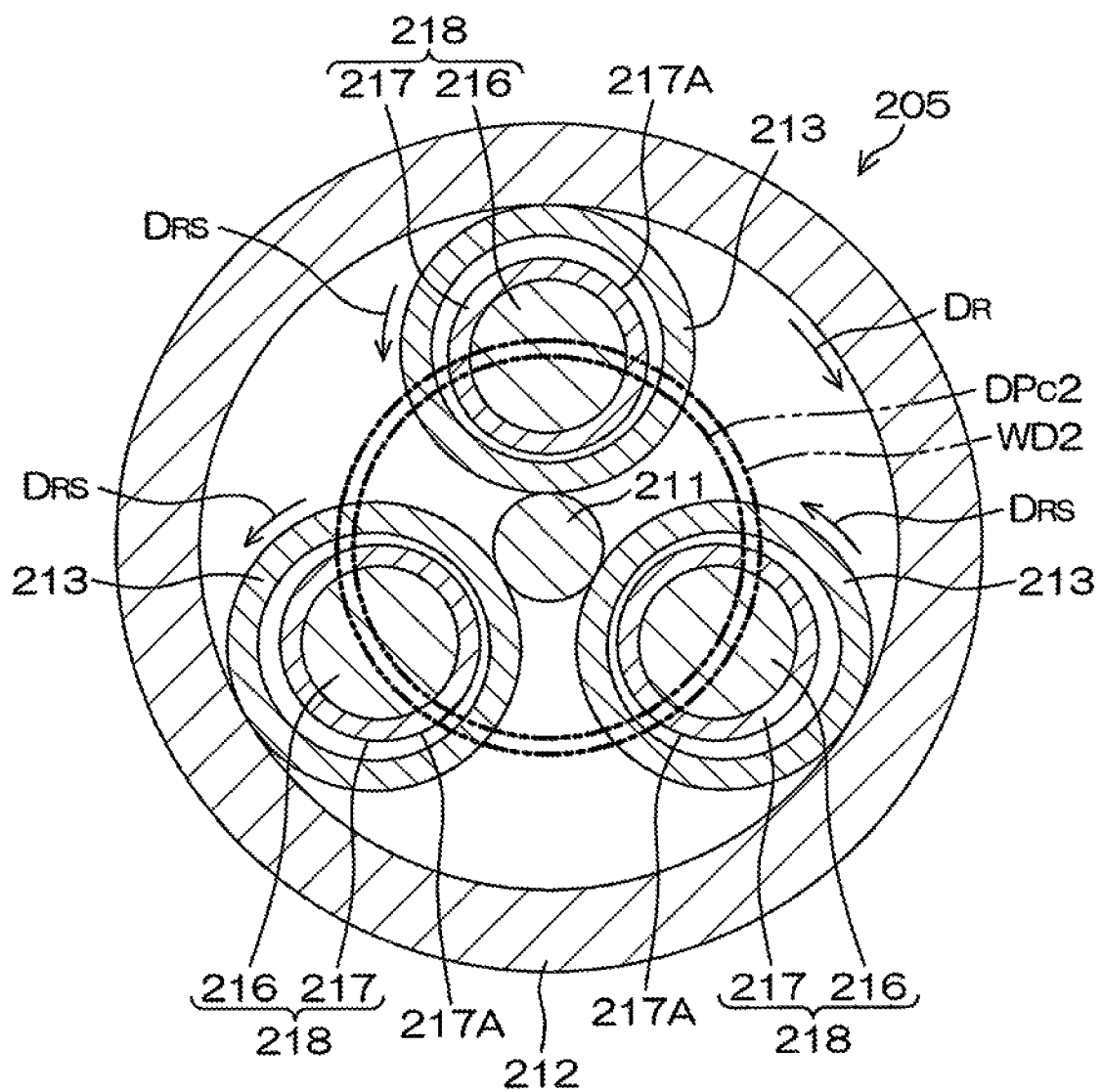
FIG. 6 is a cross-sectional view illustrating the configuration of a planet roller speed changer according to a comparative example.
Figure 7:
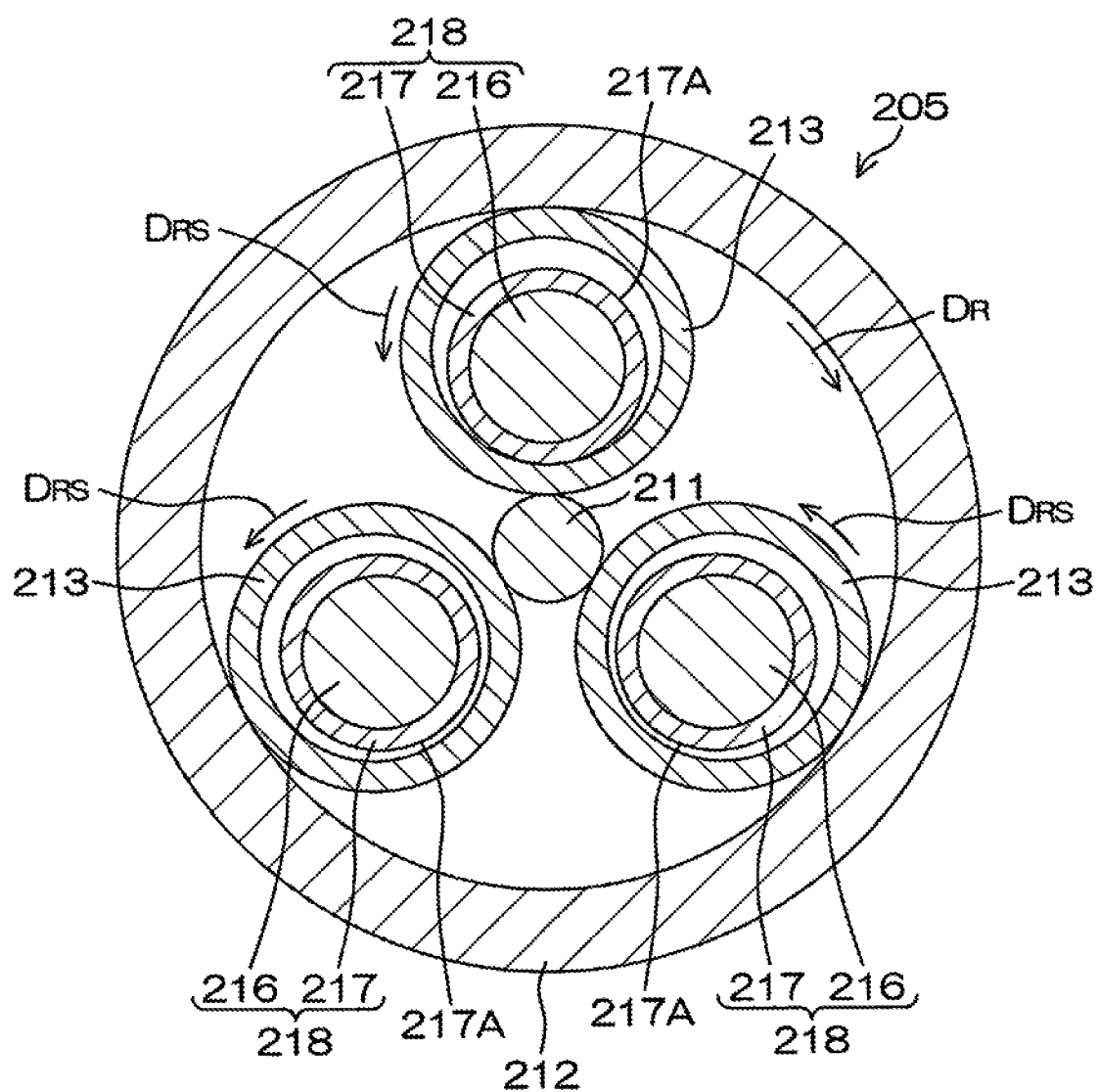
FIG. 7 is a cross-sectional view illustrating a state where the center of rotation of a carrier is misaligned with the center of revolutions of planet rollers in the planet roller speed changer according to the comparative example.

Next, a planet roller speed changer 205 in a comparative example that is compared with the first and second embodiments of the invention will be described with reference to FIG. 6 and FIG. 7. FIG. 6 is a cross-sectional view illustrating the configuration of the planet roller speed changer 205. FIG. 7 is a cross-sectional view illustrating the state where the center of rotation of a carrier (not illustrated) is misaligned with the center of revolutions of planet rollers 213 in the planet roller speed changer 205.

The planet roller speed changer 205 includes an input shaft 211, a stationary ring 212, a plurality of planet rollers 213, an output shaft (not illustrated), and the carrier (not illustrated). The stationary ring 212 is disposed so as to be concentric with the input shaft 211. Each of the planet rollers 213 is disposed so as to be in rolling contact with both the outer peripheral face of the input shaft 211 and the inner peripheral face of the stationary ring 212. The carrier is fixed to the output shaft. The carrier has a plurality of pins 216. One planet roller 213 is disposed around one pin 216. A bushing 217 is fixedly fitted onto the outer periphery of each pin 215. Each pin 216 passes through a corresponding one of the planet rollers 213, and the planet roller 213 is supported rotatably in a loosely fitted state by the pin 216.

In the planet roller speed changer 205, the position and outer diameter of each pin 216 and the inner and outer diameters of each bushing 217 are set such that a pitch circle diameter $DP_C2$ of the carrier is smaller than a value WD2 obtained by doubling the inter-axis distance between the input shaft 211 and each of the planet rollers 213. In this case, a clearance between the shaft portion 218 and the planet roller 213 on the input shaft 211 side is set smaller than a clearance between the shaft portion 218 and the planet roller 213 on the stationary ring 212 side.

Thus, when the carrier (not illustrated) is displaced downward from a prescribed position under its own weight, the outer peripheral face 217A of the bushing 217 of at least one of the three shaft portions 218 of the carrier (the shaft portion 18 located on the upper side, in FIG. 7) contacts the input shaft 211-side portion of the inner periphery of the corresponding planet roller 213. At this time, frictional force is generated between the outer peripheral face 217A of the bushing 217 and the inner peripheral face of the planet roller 213 that is rotating about its axis. In this case, because the revolving direction $D_R$ of the shaft portions 18 and the rotational direction $D_{RS}$ of each planet roller 213 are opposite to each other, the generated frictional force acts so as to extrude the shaft portion 218 in the revolving direction $D_R$. As a result, the revolution of the pin 216 is promoted. Due to a change in the relative position between the planet roller 213 and the shaft portion 218 caused by the misalignment of the center of rotation of the carrier with the center of revolutions of the planet rollers 213, rotation of the carrier is advanced or delayed. When the outer peripheral face 217A of the bushing 217 contacts the input shaft 211 side-portion of the inner periphery of the planet roller 213, the rotation of the carrier is advanced or delayed significantly. As a result, large rotational fluctuations may occur in the planet roller speed changer 205.

While the two example embodiments of the invention are described above, the invention may be implemented in other embodiments. In the first embodiment, bearings such as rolling bearings or plain bearings may be used in place of the bushings 17. In the embodiments described above, the planet rollers 13 may be directly supported by pins without interposing the bushings or the like between the pins 16 and the planet rollers 13. In this case, each shaft portion 18 is formed only of the pin 16.

In the second embodiment, when each shaft portion 18 is formed only of the pin 16, a cut portion such as a flat face may be formed on the outer peripheral face of each pin 16. In the embodiments described above, each of the planet roller speed changers 5, 105 is mounted in the image forming apparatus. However, the invention may be applied to planet roller speed changers applied to other kinds of apparatuses.

Further, a variety of design changes may be made within the scope of the invention defined in the appended claims.

What is claimed is:

1. A planet roller speed changer comprising:
   an input shaft;
   a stationary ring disposed around the input shaft so as to be concentric with the input shaft;
   a plurality of cylindrical planet rollers that are in rolling contact with both the input shaft and the stationary ring;
   an output shaft; and
   a carrier having a plurality of shaft portions each of which is disposed in a corresponding one of the planet rollers, passes through the corresponding one of the planet rollers, and supports the corresponding one of the planet rollers in a loosely fitted state such that the corresponding one of the rollers is rotatable, the carrier being fixed to the output shaft so as to be rotatable together with the output shaft, wherein
   the shaft portions of the carrier are disposed such that, when the carrier is displaced in a direction that intersects with an axial direction of the output shaft, an outer periphery of at least one of the shaft portions that are displaced with the displacement of the carrier contacts a stationary ring-side portion of an inner periphery of the corresponding planet roller without contacting an input shaft-side portion of the inner periphery of the corresponding planet roller;
   each of the shaft portions has an outer peripheral face formed of a cylindrical face;
   a pitch circle diameter of the carrier, the pitch circle diameter being defined by the shaft portions, is set larger than a value obtained by doubling an inter-axis distance between the input shaft and each of the planet rollers; and
   a clearance between each shaft portion and a corresponding one of the planet rollers on the input shaft-side portion is larger than a clearance between each shaft portion and a corresponding one of the planet rollers on the stationary ring-side portion.

2. The planet roller speed changer according to claim 1, wherein:
   each of the shaft portions has a generally cylindrical shape; and
   a cut portion is formed at an input shaft-side portion of an outer peripheral face of each of the shaft portions, a radius of the shaft portion at the cut portion is shorter than a radius of the shaft portion at the other portion than the cut portion.

3. The planet roller speed changer according to claim 2, wherein:
   each of the shaft portions includes a pin, and a cylindrical bushing fixedly fitted onto the pin; and
   the cut portion is formed on an outer peripheral face of the bushing.

* * * * *